(12) United States Patent
Ma

(10) Patent No.: US 11,347,689 B2
(45) Date of Patent: May 31, 2022

(54) METHOD, DEVICE AND COMPUTER PROGRAM PRODUCT FOR EVENT ORDERING

(71) Applicant: EMC IP Holding Company LLC, Hopkinton, MA (US)

(72) Inventor: Tianyu Ma, Shanghai (CN)

(73) Assignee: EMC IP HOLDING COMPANY LLC, Hopkinton, MA (US)

(*) Notice: Subject to any disclaimer, the term of this patent is extended or adjusted under 35 U.S.C. 154(b) by 269 days.

(21) Appl. No.: 16/830,143

(22) Filed: Mar. 25, 2020

(65) Prior Publication Data

US 2021/0081370 A1 Mar. 18, 2021

(30) Foreign Application Priority Data

Sep. 12, 2019 (CN) .......................... 201910866728.5

(51) Int. Cl.
| | |
|---|---|
| G06F 16/17 | (2019.01) |
| G06F 16/182 | (2019.01) |
| G06F 9/48 | (2006.01) |
| G06F 9/30 | (2018.01) |
| G06F 16/22 | (2019.01) |

(52) U.S. Cl.
CPC ...... *G06F 16/1734* (2019.01); *G06F 9/30065* (2013.01); *G06F 9/485* (2013.01); *G06F 16/182* (2019.01); *G06F 16/2282* (2019.01)

(58) Field of Classification Search
CPC .. G06F 16/1734; G06F 9/30065; G06F 9/485; G06F 16/182; G06F 16/2282; G06F 16/9024

USPC ........................................................ 707/827
See application file for complete search history.

(56) References Cited

U.S. PATENT DOCUMENTS

| | | | | | |
|---|---|---|---|---|---|
| 5,023,815 | A | * | 6/1991 | Wilson | G03F 9/00 |
| | | | | | 382/294 |
| 5,832,527 | A | * | 11/1998 | Kawaguchi | G06F 16/10 |
| 7,870,136 | B1 | * | 1/2011 | Cohen | G06K 9/6226 |
| | | | | | 706/45 |
| 8,392,357 | B1 | * | 3/2013 | Zou | H04L 63/1416 |
| | | | | | 715/752 |
| 10,033,756 | B1 | * | 7/2018 | Rangarajan | H04L 63/105 |
| 10,554,665 | B1 | * | 2/2020 | Badawy | H04L 63/0892 |
| 11,048,699 | B1 | * | 6/2021 | Grider | G06F 16/2272 |
| 2003/0074440 | A1 | * | 4/2003 | Grabarnik | H04L 41/0631 |
| | | | | | 709/224 |
| 2005/0165715 | A1 | * | 7/2005 | Farnham | G06Q 10/10 |

(Continued)

*Primary Examiner* — Hicham Skhoun
(74) *Attorney, Agent, or Firm* — Amin, Turocy & Watson, LLP

(57) ABSTRACT

Event ordering is provided in a distributed file system. For instance, events are generated that are associated with an object collected from nodes in the distributed file system, and an event loop indicates causal dependencies among the events, and comprises one or more reliable edges and unreliable edges. Degrees of reliability of the unreliable edges in the event loop are determined, and then at least one unreliable edge is removed from the event loop based on the determined degrees of reliability. Causal dependencies among the events in the distributed file system are analyzed by using a statistical method, and the most unreliable edge in the event loop can be removed by computing a degree of reliability of each unreliable edge, thereby avoiding the occurrence of the event loop.

20 Claims, 7 Drawing Sheets

(56) References Cited

U.S. PATENT DOCUMENTS

| | | | |
|---|---|---|---|
| 2007/0130157 A1* | 6/2007 | Jain | G06F 16/16 |
| 2008/0091693 A1* | 4/2008 | Murthy | G06F 16/9558 |
| 2009/0150531 A1* | 6/2009 | Hara | H04N 1/00347 |
| | | | 709/222 |
| 2009/0240636 A1* | 9/2009 | Hofmann | G05B 17/02 |
| | | | 706/20 |
| 2011/0016114 A1* | 1/2011 | Allen | G06F 16/94 |
| | | | 707/726 |
| 2012/0036569 A1* | 2/2012 | Cottrell | H04L 63/0823 |
| | | | 726/16 |
| 2013/0051262 A1* | 2/2013 | Boyd | G01S 5/0221 |
| | | | 370/252 |
| 2014/0143329 A1* | 5/2014 | Garg | H04L 51/32 |
| | | | 709/204 |
| 2018/0075384 A1* | 3/2018 | Luo | G06N 20/00 |

* cited by examiner

| STRONG EDGE TABLE | Es | Ch | #Ch(Es) |
|---|---|---|---|
| 1 | B→C | A→B→C→D | 10 |
| 2 | | OTHER SUB-EVENT CHAINS | 190 |
| 3 | D→E | B→C→D→E→F | 20 |
| 4 | | OTHER SUB-EVENT CHAINS | 130 |

| WEAK EDGE TABLE | Ew | Ch | #Ch(Ew) |
|---|---|---|---|
| 1 | B→C | A→B→C→D | 20 |
| 2 | | OTHER SUB-EVENT CHAINS | 180 |
| 3 | D→E | B→C→D→E→F | 30 |
| 4 | | OTHER SUB-EVENT CHAINS | 170 |

⬇ UPDATE THE STRONG EDGE TABLE WHEN B→C IS A STRONG EDGE

| STRONG EDGE TABLE | Es | Ch | #Ch(Es) |
|---|---|---|---|
| 1 | B→C | A→B→C→D | 10+1 |
| 2 | | OTHER SUB-EVENT CHAINS | 190 |
| 3 | D→E | B→C→D→E→F | 20 |
| 4 | | OTHER SUB-EVENT CHAINS | 130 |

| WEAK EDGE TABLE | Ew | Ch | #Ch(Ew) |
|---|---|---|---|
| 1 | B→C | A→B→C→D | 20 |
| 2 | | OTHER SUB-EVENT CHAINS | 180 |
| 3 | D→E | B→C→D→E→F | 30 |
| 4 | | OTHER SUB-EVENT CHAINS | 170 |

| STRONG EDGE TABLE | Es | Ch | #Ch(Es) |
|---|---|---|---|
| 1 | B→C | A→B→C→D | 10 |
| 2 | | OTHER SUB-EVENT CHAINS | 190 |
| 3 | D→E | B→C→D→E→F | 20 |
| 4 | | OTHER SUB-EVENT CHAINS | 130 |

| WEAK EDGE TABLE | Ew | Ch | #Ch(Ew) |
|---|---|---|---|
| 1 | B→C | A→B→C→D | 20 |
| 2 | | OTHER SUB-EVENT CHAINS | 180 |
| 3 | D→E | B→C→D→E→F | 30 |
| 4 | | OTHER SUB-EVENT CHAINS | 170 |

⬇ UPDATE THE WEAK EDGE TABLE WHEN B→C IS A WEAK EDGE

460

| STRONG EDGE TABLE | Es | Ch | #Ch(Es) |
|---|---|---|---|
| 1 | B→C | A→B→C→D | 10 |
| 2 | | OTHER SUB-EVENT CHAINS | 190 |
| 3 | D→E | B→C→D→E→F | 20 |
| 4 | | OTHER SUB-EVENT CHAINS | 130 |

| WEAK EDGE TABLE | Ew | Ch | #Ch(Ew) |
|---|---|---|---|
| 1 | B→C | A→B→C→D | 20+1 |
| 2 | | OTHER SUB-EVENT CHAINS | 180 |
| 3 | D→E | B→C→D→E→F | 30 |
| 4 | | OTHER SUB-EVENT CHAINS | 170 |

Fig. 4B

METHOD, DEVICE AND COMPUTER PROGRAM PRODUCT FOR EVENT ORDERING

RELATED APPLICATION

The present application claims the benefit of priority to Chinese Patent Application No. 201910866728.5, filed on Sep. 12, 2019, which application is hereby incorporated into the present application by reference herein in its entirety.

FIELD

Embodiments of the present disclosure generally relate to the field of information technologies, and more specifically, to a method, device and computer program product for event ordering in a distributed file system.

BACKGROUND

A distributed file system provides a lot of significant advantages for building a high performance computing environment. On one hand, the large-scale distributed file system may be extended easily. On the other hand, different types of data accessible to different types of clients may be stored using different protocols. The distributed file system may run on a cluster of nodes, which permits the client to be connected to any node in the cluster to access and/or modify data stored on any node in the cluster.

Events within a file system may include creating a new file, changing a permission of a file, changing metadata of a file, and the like. These events may occur concurrently, and may be processed on different nodes in the cluster of nodes. The distributed file system may include an appropriate lock mechanism which blocks access to a file when a further user or file system process is modifying the file. When aggregating a plurality of events in a distributed file system, it is often expected to know a causal order of these events.

SUMMARY

Embodiments of the present disclosure provide a method, device and computer program product for event ordering in a distributed file system.

In one aspect of the present disclosure, there is provided a method for event ordering. The method comprises generating, based on a plurality of events associated with an object collected from a plurality of nodes in a distributed file system, an event loop indicating causal dependencies among the plurality of events, wherein the event loop comprises one or more reliable edges and a plurality of unreliable edges. The method further comprises determining a plurality of degrees of reliability of the plurality of unreliable edges in the event loop, and removing at least one unreliable edge from the event loop based on the determined plurality of degrees of reliability.

In another aspect of the present disclosure, there is provided a device for event ordering. The device comprises a processing unit and a memory, wherein the memory is coupled to the processing unit and stores instructions thereon. The instructions, when executed by the processing unit, perform acts of generating, based on a plurality of events associated with an object collected from a plurality of nodes in a distributed file system, an event loop indicating causal dependencies among the plurality of events, wherein the event loop comprises one or more reliable edges and a plurality of unreliable edges. The acts further comprise determining a plurality of degrees of reliability of the plurality of unreliable edges in the event loop, and removing at least one unreliable edge from the event loop based on the determined plurality of degrees of reliability.

In a further aspect of the present disclosure, there is provided a computer program product. The computer program product is tangibly stored on a non-transitory computer-readable medium and comprises computer-executable instructions. The computer-executable instructions, when executed, cause a computer to perform the method or process according to embodiments of the present disclosure.

This Summary is provided to introduce a selection of concepts in a simplified form that are further described below in the Detailed Description. This Summary is not intended to identify key features or essential features of the present disclosure, nor is it intended to be used to limit the scope of the present disclosure.

BRIEF DESCRIPTION OF THE DRAWINGS

The above and other objectives, features and advantages of the present disclosure will become more apparent, through the following detailed description of the example embodiments of the present disclosure with reference to the accompanying drawings, in which the same reference numbers generally refer to the same elements.

FIG. 4A illustrates a schematic diagram for updating a strong edge table according to embodiments of the present disclosure;

FIG. 4B illustrates a schematic diagram for updating a weak edge table according to embodiments of the present disclosure;

DETAILED DESCRIPTION OF EMBODIMENTS

Figure 1:
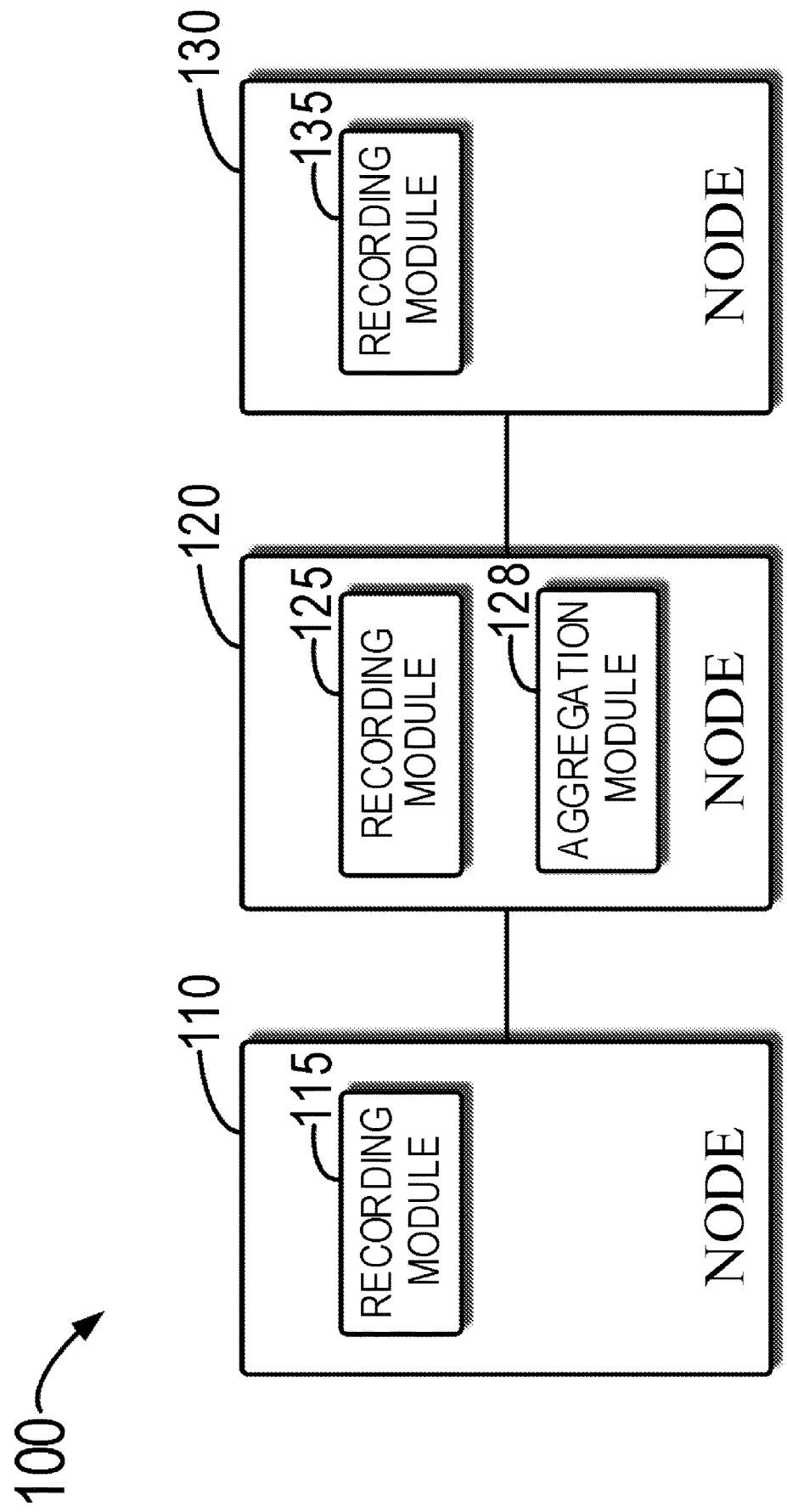
FIG. 1 illustrates a schematic diagram of a distributed file system according to embodiments of the present disclosure.

Various embodiments of the present disclosure will now be described in detail with reference to the drawings. Although some embodiments disclosed herein are illustrated in the drawings, it would be appreciated that the present disclosure may be implemented in various manners and should not be limited to the embodiments described herein. Rather, these embodiments are provided to disclose the present disclosure more thoroughly and completely, and to convey the scope of the present disclosure fully to those skilled in the art.

As used herein, the term "includes" and its variants are to be read as open-ended terms that mean "includes, but is not limited to." The term "or" is to be read as "and/or" unless the context clearly indicates otherwise. The term "based on" is to be read as "based at least in part on." The term "an example embodiment" and "an embodiment" are to be read as "at least one example embodiment." The term "another embodiment" is to be read as "at least another embodiment."

The terms "first," "second," and the like may refer to different or the same objects. Other definitions, either explicit or implicit, may be included below.

Typically, it is required to sort a plurality of events collected from nodes in a distributed file system in a causal order, for example, for building a system log. A plurality of events for the same or related objects in the nodes may be collected, and then causal dependencies among the events may be built through version numbers. One event in a low version generally occurs before another event in a high version. Therefore, events having causal dependencies may be linked to one another through directed edges, to build an event chain or event map. Each edge may be divided into a reliable edge or an unreliable edge according to its degree of reliability, where the reliable edge indicates that two events of the edge must have a causal dependency, while the unreliable edge indicates that two events of the edge may have or may not have a causal dependency.

In some scenarios, the event chain generated through version numbers may include an event loop (as some edges are unreliable edges), which is different than the actual scenario. As such, it is required to remove one or more unreliable edges from the event loop so as to avoid an event loop. A method of removing an unreliable edge is to build a series of rules, which is a deterministic method for eliminating an event loop. However, the rule-based method cannot guarantee that all problems of the event loop can be solved. In some scenarios, it is unable to remove the unreliable edge or it is unclear about which unreliable edge in the plurality of unreliable edges should be removed, and wrongly removing an unreliable edge may result in an error in the whole event ordering process. Hence, the traditional method cannot effectively solve all problems of the event loop during event ordering in a distributed file system. In addition, the traditional rule-based method depends heavily on extensive experience, causing high labor costs and difficulties in implementation.

To this end, embodiments of the present disclosure provide a new solution for removing an unreliable edge from an event loop based on statistics. Embodiments of the present disclosure analyze causal dependencies of events in the distributed file system using a statistical method, and remove the most unreliable edge in the event loop by computing a degree of reliability of each unreliable edge, thereby avoiding the occurrence of the event loop.

Basic principles and several example implementations of the present disclosure will be described below with reference to FIGS. 1 to 6. It would be appreciated that these example embodiments are provided for enabling those skilled in the art to better understand and further implement embodiments of the present disclosure, rather than suggesting any limitation to the scope of the present disclosure.

FIG. 1 illustrates a schematic diagram of a distributed file system 100 according to embodiments of the present disclosure. As shown in FIG. 1, the distributed file system 100 may include a plurality of nodes 110, 120, 130, each of which may be a computing device, such as a server, computer, and the like. In embodiments of the present disclosure, each node may include a recording module for recording an event, wherein the event may include, but is not limited to, creating a file, modifying a file, deleting a file, renaming a file, and the like. Referring to FIG. 1, the node 110 includes a recording module 115, the node 120 includes a recording module 125, and the node 130 includes a recording module 135. Since clocks of the nodes in the distributed file system 100 are not necessarily synchronous and there may be transmission and synchronization delay, the distributed file system 100 does not indicate the casual dependencies of the events by use of the timestamps. Instead, the distributed file system 100 indicates the causal dependencies of the events using version numbers of the object (such as the file). For example, one operation in an old version is typically performed prior to another operation in a new version.

Continuing to refer to FIG. 1, one or more nodes in the distributed file system 100 may include an aggregation module for aggregating events on all the nodes. For example, the node 120 includes an aggregation module 128. The aggregation module 128 may collect events recorded respectively on the recording module 115, the recording module 125 and the recording module 135, and may order all events for the same or related object, such as, a plurality of events for the same object. In some cases, the event chain generated from event ordering may be an event loop. Embodiments of the present disclosure can remove the most unreliable edge from the event loop accurately based on the statistical method.

Figure 2:
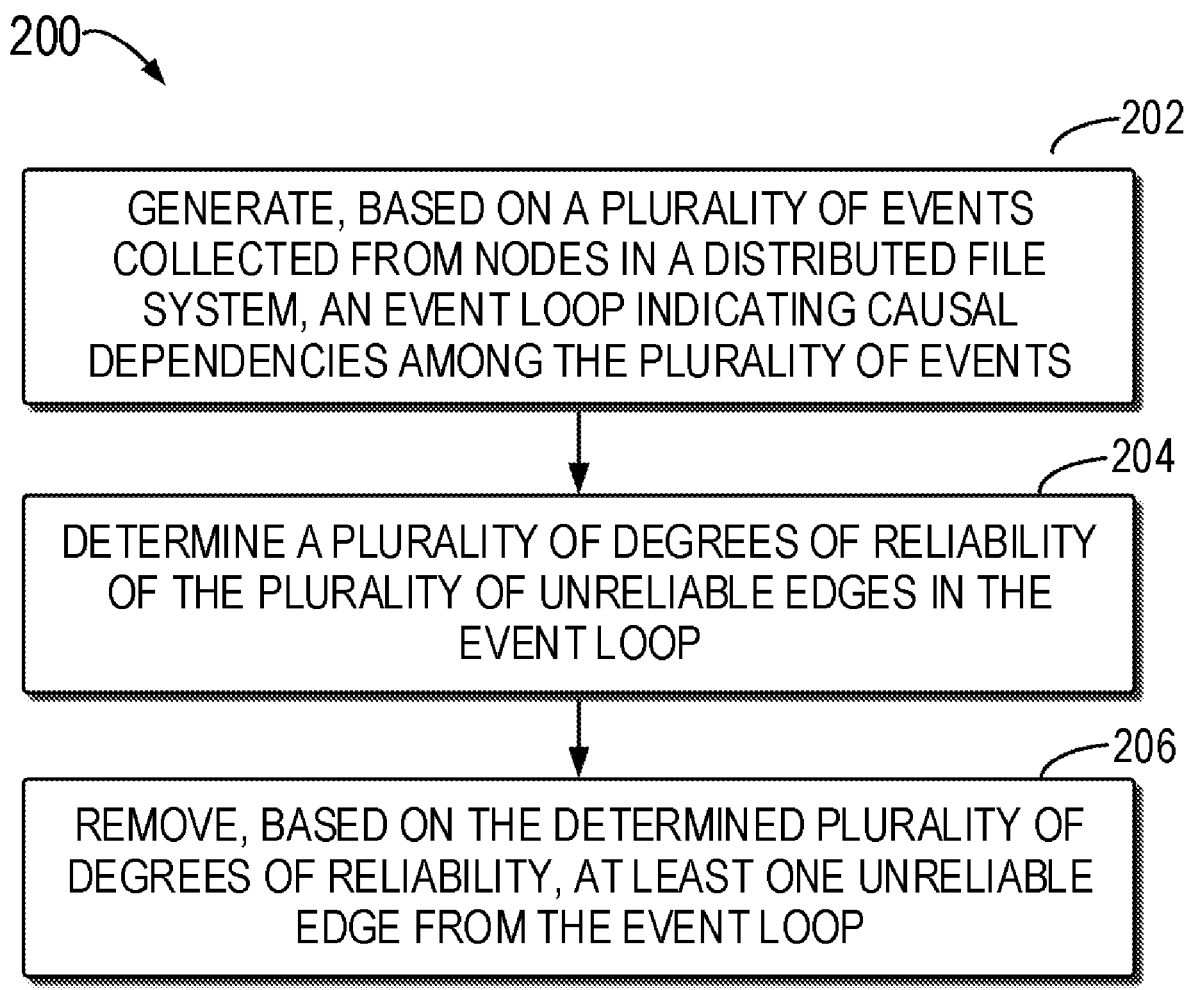
FIG. 2 illustrates a flowchart of a method for event ordering according to embodiments of the present disclosure.

FIG. 2 illustrates a flowchart of a method 200 for event ordering according to embodiments of the present disclosure. The method 200, for example, may be performed by one or more nodes as described with reference to FIG. 1, such as the node 120.

At 202, based on a plurality of events associated with one or more objects collected from the plurality of nodes in the distributed file system, an event loop indicating causal dependencies among the plurality of events is generated, where the event loop includes one or more reliable edges and a plurality of unreliable edges. The method according to embodiments of the present disclosure removes the most unreliable edge from the event loop, in a case that the event loop includes at least two unreliable edges. It is to be understood that if the event loop includes only one unreliable edge, the unreliable edge may be removed directly.

In the context of the present disclosure, a reliable edge (also referred to as "a strong edge") indicates that a causal dependency between two events can be guaranteed; and an unreliable edge (also referred to as "a weak edge") indicates that a causal dependency between two events cannot be guaranteed, which only probably exists, and a degree of reliability of the unreliable edge may be characterized by its probability of reliability. In some embodiments, if the causal dependency is based on a pair of modified Mode number and Mode version number, the edge may be regarded as a strong edge. If the causal dependency is based on a pair of viewed Mode number and Mode version number, the edge may be regarded as a weak edge. The Mode may indicate a representation within the memory or a data structure on a disk, which may store information or metadata of related files and directories, such as file sizes, file ownership, access modes (read, write, and execution permissions), creation and modification time and dates, file types, data protection process information (such as encryption and/or compression information), snapshot information, hash values associated with file locations, mapping to cloud data objects, pointers to cloud metadata objects, and the like. It would be appreciated that any existing or to-be-developed method of determining reliable edges and unreliable edges may be used in combination with the embodiments of the present disclosure.

Typically, there exist causal dependencies among events in a distributed file system. For example, a file or directory needs to be first created and then can be modified or removed, and it is impossible to remove a non-existing file. If removing a non-existing file is tried, the distributed file system may throw an exception and fail, which would not generate an event. For example, a file or directory may undergo a process of creating→modifying→deleting or creating→renaming→deleting or other acts, in some cases.

At 204, a plurality of degrees of reliability of a plurality of unreliable edges in an event loop are determined. In some embodiments, based on a preconfigured reliable edge table (such as a strong edge table) and unreliable edge table (such as a weak edge table), a probability of reliability of each of the plurality of unreliable edges in the respective sub-event chain may be determined through Bayes theorem. In other words, the reliable probability of unreliable edge (such as weak edge) may be determined in a certain sub-event chain.

At 206, based on the determined plurality of degrees of reliability, at least one unreliable edge is removed from the event loop. For example, the unreliable edge with the lowest degree of reliability may be removed from the event loop, and then the events in the event loop may be reordered so as to form an acyclic event chain. When trying to remove one or more weak edges in the event loop, it is actually a process of deciding which weak edge(s) is more unreliable, for example, based on reliable probabilities of respective weak edges.

Therefore, the method 200 according to embodiments of the present disclosure analyzes causal dependencies of events in a distributed file system by using a statistical method, and can remove the weakest edge in the event loop accurately, thereby avoiding the event loop.

Some embodiments of the present disclosure may include two stages. In the first stage, historical data are collected, and events are processed and useful information is stored during the successful event orderings in history. In the second stage, reliable probability of each weak edge in the event loop is calculated in the actual scenario, and it is determined which weak edge is to be removed when the event loop occurs, using information stored in the first stage. Hereinafter, an example implementation of the first stage will be described with reference to FIG. 3 and FIGS. 4A-4B, and an example implementation of the second stage will be based on the determined plurality of degrees of reliability with reference to FIG. 5.

Figure 3:
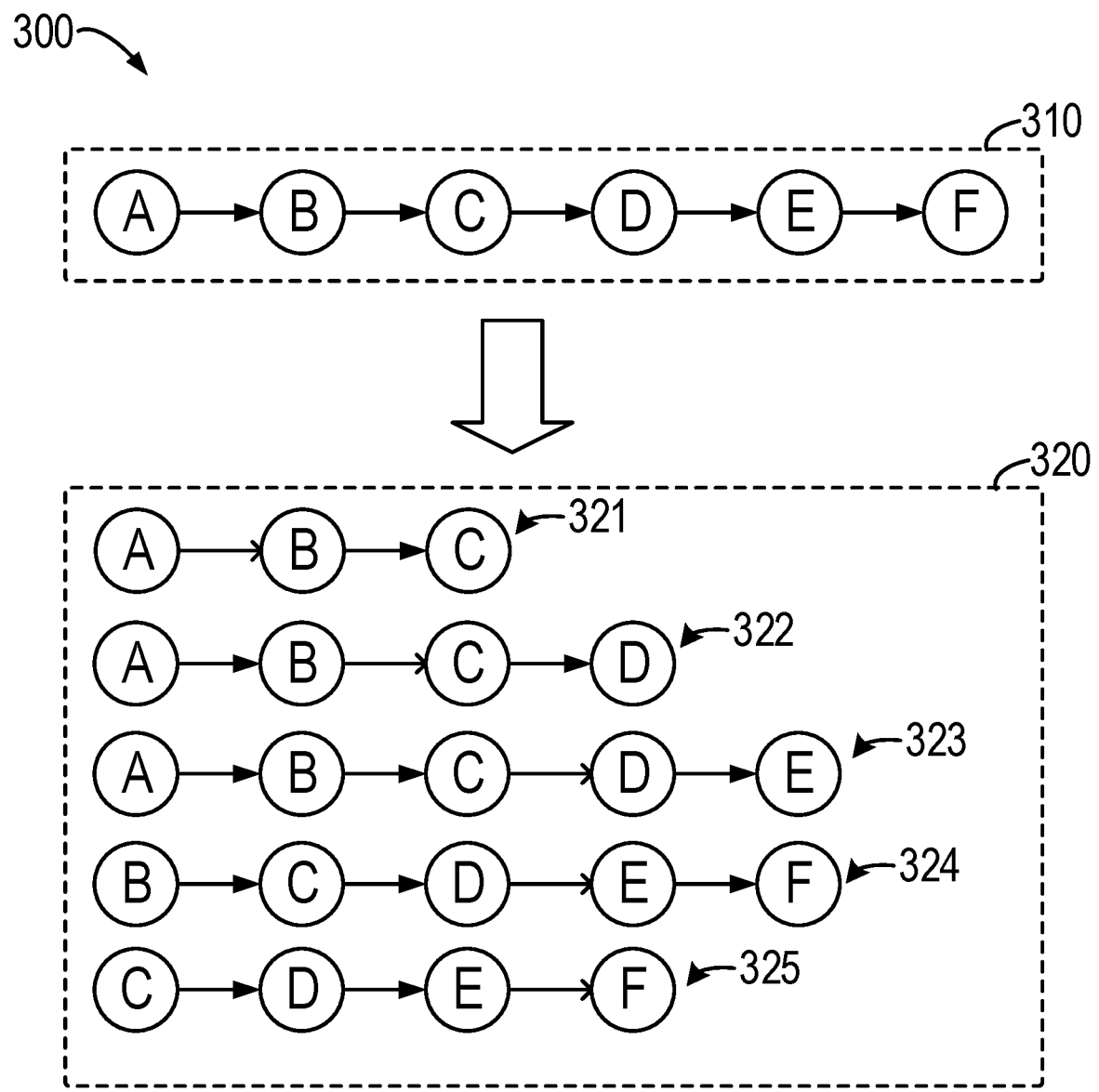
FIG. 3 illustrates a schematic diagram for splitting an event chain according to embodiments of the present disclosure.

FIG. 3 illustrates a diagram 300 for splitting an event chain according to embodiments of the present disclosure. During the historically successful event ordering, a directed acyclic graph of events may be obtained, for example, various acyclic event chains. For a long event chain, each of the plurality of acyclic event chains is first split into a plurality of sub-event chains based on a predetermined splitting rule. As shown in FIG. 3, an acyclic event chain 310 may be split into a plurality of sub-event chains 320. The splitting rule, for example, may include that each sub-event chain includes at most 5 events, wherein there are at most 2 events before the edge to be evaluated and at most 1 event after the edge to be evaluated. It would be appreciated that the splitting rule is a hyperparameter, which may be adjusted according to the actual needs.

Continuing to refer to FIG. 3, based on the above rule, the acyclic event chain 310 A→B→C→D→E→F may be split into a plurality of sub-event chains, including: a sub-event chain 321 A→B→C for evaluating an edge A→B; a sub-event chain 322 A→B→C→D for evaluating an edge B→C; a sub-event chain 323 A→B→C→D→E for evaluating an edge C→D; a sub-event chain 324 B→C→D→E→F for evaluating an edge D→E; and a sub-event chain 325 C→D→E→F for evaluating an edge E→F. According to embodiments of the present disclosure, only limited numbers of events before and after the edge to be evaluated are used for computing the probability of reliability. The reason for splitting an acyclic event chain is that events too far away have little impact on the edge and therefore may be neglected.

Next, the strong edge table and the weak edge table according to embodiments of the present disclosure may be maintained based on split sub-event chains. For a given edge in a given sub-event chain, it is first determined whether the given edge is a strong edge or a weak edge. If it is a strong edge, the strong edge table is updated as shown in FIG. 4A; instead, if it is a weak edge, the weak edge table is updated as shown in FIG. 4B.

In embodiments of the present disclosure, an event chain or a sub-event chain may represent a chain of a plurality of events having causal dependencies, for example, creating-→modifying→deleting, where Es represents an event that an edge E is a strong edge, Ew represents an event that the edge E is a weak edge, and Ch represents an event that a sub-event chain Ch occurs. Moreover, #Ct represents a total number of sub-event chains, #Ch represents a number of sub-event chains Ch, #Et represents a total number of sub-event chains of the evaluated edge E (where E is either weak or strong), #Es represents a number of sub-event chains in which the edge E is a strong edge in all sub-event chains with the evaluated edge E, #Ew represents a number of sub-event chains in which the edge E is a weak edge in all sub-event chains with the evaluated edge E, #Ch(Es) represents a number of sub-event chains Ch with a strong edge E, #Ch(Ew) represents a number of sub-event chains Ch with a weak edge E, and #Ct(Es) represents a total number of sub-event chains with a strong edge E.

FIG. 4A illustrates a diagram 400 for updating a strong edge table according to embodiments of the present disclosure. As shown in FIG. 4A, embodiments of the present disclosure provide a strong edge table and a weak edge table. In the strong edge table, entries in each row include strong edge Es, sub-event chain Ch, and number #Ch(Es) of sub-event chains Ch having the strong edge E. In other words, entries in each row store frequency of sub-event chain Ch, wherein the sub-event chain Ch evaluates the edge E and E is a strong edge. In a weak edge table, entries in each row include weak edge Ew, sub-event chain Ch, a number #Ch(Ew) of sub-event chains Ch with the weak edge E. In other words, entries in each row store frequency of sub-event chains Ch, where the sub-event chain Ch evaluates the edge E and the E is a weak edge. For a non-existing strong edge or weak edge in the strong edge table and the weak edge table, a new entry may be inserted; and for an existing strong edge or weak edge in the strong edge table or the weak edge table, chain number information may be updated.

Continuing to refer to FIG. 4A, the table 410 illustrates a state prior to processing the sub-event chain 322 A→B→C →D as described above. For simplicity, some sub-event chains are merged into the table 410, which are represented by "OTHER SUB-EVENT CHAINS". Before updating the strong edge table or weak edge table, it is first determined whether the given edge is a strong edge or weak edge. If the given edge B→C is determined as strong edge, the strong edge table is updated in the table 410, and the corresponding entry in the strong edge table may be incremented by 1 (for example, in the row with the serial No. 1 in the strong edge table). The updated strong edge table is shown as table 420.

FIG. 4B illustrates a diagram 450 of updating a weak edge table according to embodiments of the present disclosure. If the given edge B→C is determined as a weak edge, the weak edge table is updated in the table 410, and the corresponding entry in the weak edge table may be incremented by 1 (for example, in the row with the serial No. 1 in the weak edge table). The updated weak edge table is shown as table 460.

Subsequently, after processing the historical sub-event chains has been completed, a weak edge table and a strong edge table may be built. Then, based on the strong edge table and the weak edge table, a probability of reliability of each weak edge in the respective sub-event chain may be calculated by use of the Bayes theorem.

The Bayes theorem is a theorem about conditional probabilities (or edge probabilities) of random events A and B, where P(A|B) is a probability of occurrence of A given that B occurs. The Bayes theorem may be represented through the following formula (1):

$$P(A|B)=P(B|A)*P(A)/P(B) \quad (1)$$

where A and B denote events, and P(B) is not equal to 0; P(A|B) is a probability of occurrence of A given that B occurs, P(B|A) is a probability of occurrence of B given that A occurs, P(A) is a prior probability or marginal probability of the event A, and P(B) is a prior probability or edge probability of the event B.

The following formula (2) illustrates that a probability of reliability of a weak edge when a given sub-event chain occurs is calculated using the Bayes theorem:

$$P(Es|Ch)=P(Ch|Es)*P(Es)/P(Ch) \quad (2)$$

where P(Es|Ch) denotes a conditional probability of occurrence of an event Es given that a sub-event chain Ch occurs, or a probability of reliability that the edge E is a strong edge in the sub-event chain Ch; P(Ch|Es) represents a conditional probability of occurrence of a sub-event chain Ch given that the edge E is a strong edge; and P(Es) is a marginal probability of observing the strong edge E; and P(Ch) is a marginal probability of observing the sub-event chain Ch.

In order to calculate the conditional probability P(Es|Ch) of occurrence of the event Es given that the sub-event chain Ch occurs, it is required to calculate P(Ch|Es), P(Es) and P(Ch). P(Ch|Es), P(Es) and P(Ch) may be calculated based on the strong edge table and the weak edge table. Specifically, P(Ch|Es), P(Es) and P(Ch) may be calculated through the following formulas (3)-(5):

$$P(Ch|Es)=\#Ch(Es)/\#Ct(Es) \quad (3)$$

$$P(Es)=\#Es/\#Et \quad (4)$$

$$P(Ch)=\#Ch/\#Ct \quad (5)$$

Consequently, according to the above formulas (3)-(5), for a given sub-event chain A→B→C→D and a given edge B→C, P(Ch|Es)=P(sub chain event A→B→C→D|edge B→C is a strong edge)=10/(10+190)=0.05, P(Es)=P(edge B → C is a strong edge)=200/400=0.5, and P(Ch)=P(sub-event chain is A→B→C→D)=30/750=0.04, which are calculated based on the table 410 in FIG. 4A. In this way, the probability P(Es|Ch) of occurrence of the event Es when the given event chain Ch occurs is calculated.

Figure 5:
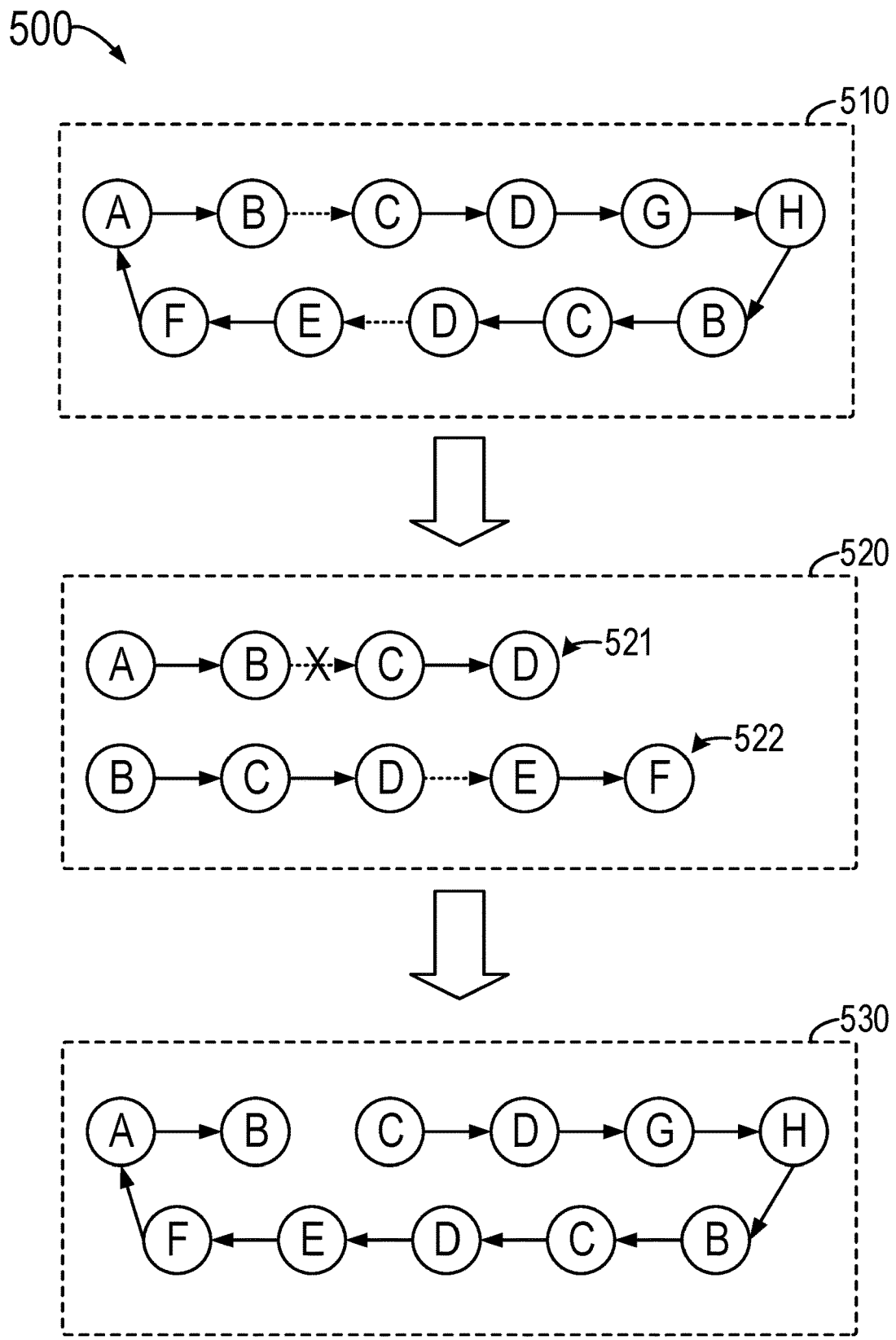
FIG. 5 illustrates a schematic diagram for removing a weak edge from an event loop according to embodiments of the present disclosure.

FIG. 5 illustrates an example diagram 500 for removing a weak edge from an event loop according to embodiments of the present disclosure. For example, if a contradictory event loop occurs during actual event ordering, data in the strong edge table and the weak edge table in FIGS. 4A and 4B may be used to eliminate the event loop. As shown in FIG. 5, assume that there is an event loop 510: A→B→C→D→G→H→B→C→D→E→F→A, weak edges therein (for example, the weak edges B→C and D→E represented by the dotted lines in the event loop 510) are first identified, and then the event loop 510 is split, based on the weak edges, into a plurality of sub-event chains 520 including sub-event chains 521 (A→B→C→D) and 522 (B→C→D→E→F), such that each of the split sub-event chains includes a weak edge. It would be appreciated that whether edges, other than the weak edge to be evaluated, are strong edges or not is not a matter of concern in each sub-event chain, and it is only required to focus on the sequence of other events. In addition, as shown in FIG. 5, some events may occur multiple times in the event chain.

After obtaining the plurality of sub-event chains 520 including the weak edge to be evaluated, a probability of reliability of each weak edge in the respective sub-event chain is determined based on the preconfigured weak edge table and strong edge table, using the Bayes theorem. For example, the probability of reliability of the edge B*C in the sub-event chain A→B→C→D may be determined as P(B→C is a strong edge|the sub-event chain is A→B→C→D)=P(the sub-event chain A→B→C→D|edge B→C is the strong edge)→P(edge B → C is a strong edge)/P(the sub-event edge is A→B→C→D)=0.05→0.5/0.04=0.625. Based on a similar method, P(D→E is a strong edge|the sub-event chain is B→C→D→E→F)=0.857 may be also calculated.

Through comparison, the probability of reliability of P(B→C is a strong edge|the sub-event chain is A→B→C→D) is less than P(D→E is a strong edge|the sub-event chain is B→C→D→E→F). Accordingly, it is more likely that the edge D→E is a strong edge. As a result, the weak edge B→C may be removed from the event loop A→B→C→D→G→H→B→C→D→E→F→A, resulting in an acyclic event chain 530, namely C→D→G→H→B→C→D→E→F→A. For example, a weak edge having the lowest or a lower degree of reliability may be removed.

Therefore, according to some embodiments of the present disclosure, the solution can determine a probability of reliability of a weak edge in the respective event chain by using a Bayes theorem-based statistical method, and thus can determine which weak edge should be removed from the contradictory event loop. Hence, embodiments of the present disclosure can remove efficiently a loop from an event loop, thus solving the problem of the event loop.

Figure 6:
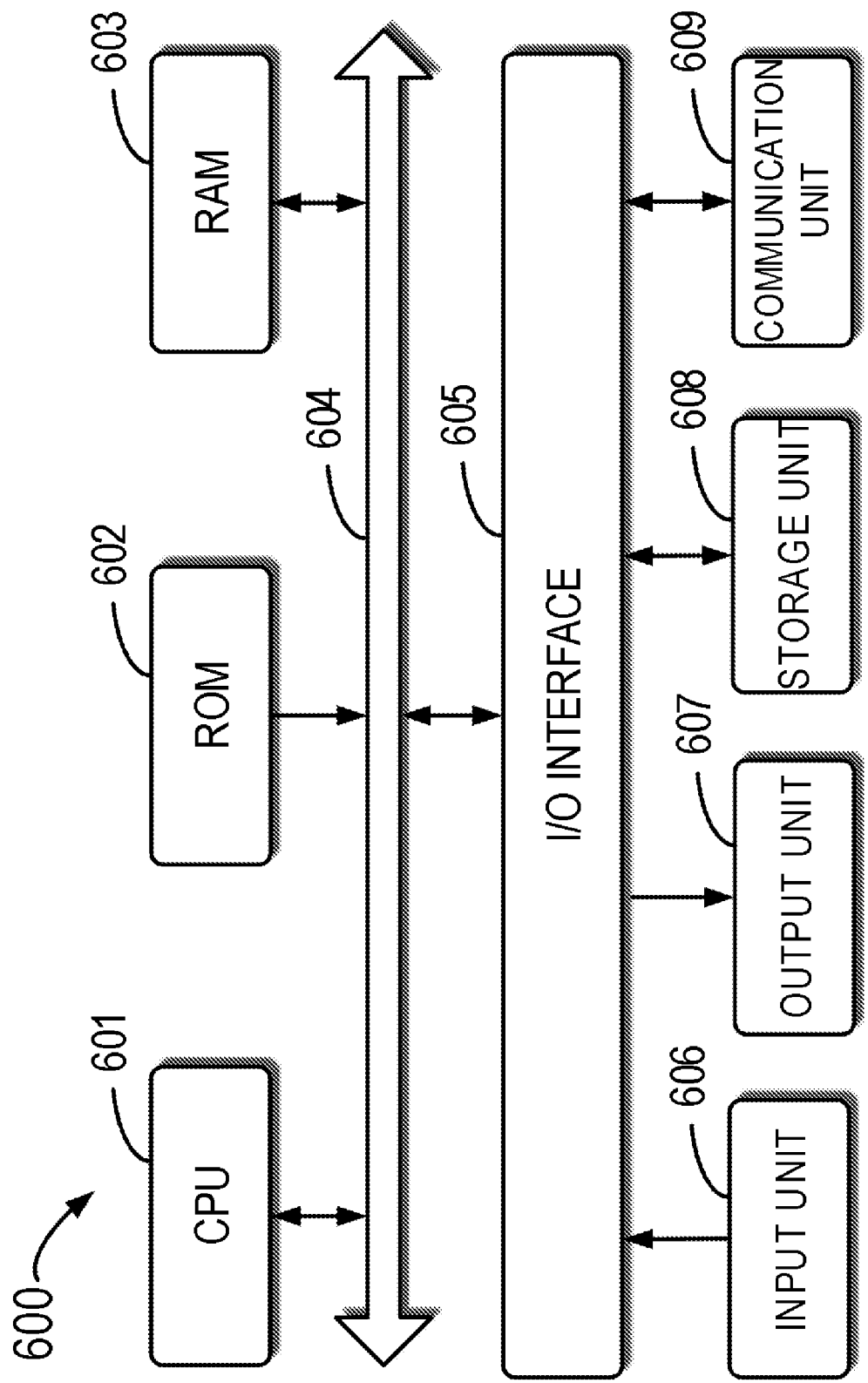
FIG. 6 illustrates a schematic block diagram of a device that may be used to implement embodiments of the present disclosure.

FIG. 6 illustrates a block diagram of an example device 600 that may be used to implement embodiments of the present disclosure. The device 600 may be a device or apparatus as described in embodiments of the present disclosure. As shown, the device 600 includes a central processing unit (CPU) 601 which performs various appropriate acts and processing, based on computer program instructions stored in a read-only memory (ROM) 602 or computer program instructions loaded from a storage unit 608 to a random access memory (RAM) 603. The RAM 603 stores therein various programs and data required for operations of the device 600. The CPU 601, the ROM 602 and the RAM 603 are connected via a bus 604 with one another. An input/output (I/O) interface 605 is also connected to the bus 604.

The following components in the device 600 are connected to the I/O interface 605: an input unit 606 such as a keyboard, a mouse and the like; an output unit 607 including various kinds of displays and a loudspeaker, etc.; a storage unit 608 including a magnetic disk, an optical disk, and etc.; a communication unit 609 including a network card, a modem, and a wireless communication transceiver, etc. The communication unit 609 allows the device 600 to exchange information/data with other devices through a computer network such as the Internet and/or various kinds of telecommunications networks.

Various processes described above may be executed by the processing unit 601. For example, in some embodiments, the methods may be implemented as a computer software program that is tangibly included in a machine readable medium, e.g., the storage unit 608. In some embodiments, part or all of the computer programs may be loaded and/or mounted onto the device 600 via ROM 602 and/or communication unit 609. When the computer program is loaded to the RAM 603 and executed by the CPU 601, one or more steps of the methods as described above may be executed.

In some embodiments, the method and process as described above may be implemented as a computer program product. The computer program product may include a computer-readable storage medium having computer-readable program instructions thereon for causing a processor to carry out aspects of the present disclosure.

The computer-readable storage medium may be a tangible device that can retain and store instructions for use by an instruction execution device. The computer-readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer-readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer-readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals sent through a wire.

Computer-readable program instructions described herein can be downloaded to respective computing/processing devices from a computer-readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer-readable program instructions from the network and forwards the computer-readable program instructions for storage in a computer-readable storage medium within the respective computing/processing device.

Computer-readable program instructions for carrying out operations of the present disclosure may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer-readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer-readable program instructions by utilizing state information of the computer-readable program instructions to personalize the electronic circuitry, in order to perform aspects of the present disclosure.

These computer-readable program instructions may be provided to a processor unit of a general purpose computer, special purpose computer, or other programmable data processing device to produce a machine, such that the instructions, when executed via the processing unit of the computer or other programmable data processing device, create means for implementing the functions/acts specified in the flowchart and/or block diagram block or blocks. These computer-readable program instructions may also be stored in a computer-readable storage medium that can direct a computer, a programmable data processing device, and/or other devices to function in a particular manner, such that the computer-readable storage medium having instructions stored therein includes an article of manufacture including instructions which implement aspects of the function/act specified in the flowchart and/or block diagram block or blocks.

The computer-readable program instructions may also be loaded onto a computer, other programmable data processing device, or other devices to cause a series of operational steps to be performed on the computer, other programmable devices or other device to produce a computer implemented process, such that the instructions which are executed on the computer, other programmable devices, or other devices implement the functions/acts specified in the flowchart and/or block diagram block or blocks.

The flowchart and block diagrams illustrate the architecture, functionality, and operation of possible implementations of systems, methods and computer program products according to various embodiments of the present disclosure. In this regard, each block in the flowchart or block diagrams may represent a module, snippet, or portion of code, which includes one or more executable instructions for implementing the specified logical function(s). In some alternative implementations, the functions noted in the block may occur out of the order noted in the figures. For example, two blocks in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

I claim:

1. A method for event ordering, comprising:
generating, by a system comprising a processor and based on a plurality of events associated with an object collected from a plurality of nodes in a distributed file system, an event loop indicating causal dependencies among the plurality of events, the event loop comprising one or more reliable edges and a plurality of unreliable edges;
determining a plurality of degrees of reliability of the plurality of unreliable edges in the event loop; and
removing, based on the plurality of degrees of reliability, at least one unreliable edge of the plurality of unreliable edges from the event loop.

2. The method of claim 1, further comprising:
collecting a plurality of acyclic event chains that were ordered successfully in history; and
processing the plurality of acyclic event chains; and
storing historical statistical data related to reliable edges and unreliable edges.

3. The method of claim 2, wherein the processing of the plurality of acyclic event chains comprises:
splitting, based on a predetermined splitting rule, each of the plurality of acyclic event chains into a plurality of sub-event chains.

4. The method of claim 3, wherein the storing of the historical statistical data related to reliable edges and unreliable edges comprises:
for a given edge in a given sub-event chain, determining whether the given edge is a reliable edge or an unreliable edge;
according to a determination that the given edge is a reliable edge, updating first information related to the reliable edge and the given sub-event chain in a reliable edge table; and
according to a determination that the given edge is an unreliable edge, updating second information related to the unreliable edge and the given sub-event chain in an unreliable edge table.

5. The method of claim 1, wherein the generating the event loop indicating the causal dependencies among the plurality of events comprises:
identifying the plurality of unreliable edges in the event loop; and
splitting the event loop into a plurality of sub-event chains such that each of the plurality of sub-event chains comprises one unreliable edge, respectively.

6. The method of claim 5, wherein the determining the plurality of degrees of reliability of the plurality of unreliable edges in the event loop comprises:
determining, based on a preconfigured reliable edge table and an unreliable edge table, a probability of reliability of each of the plurality of unreliable edges in a respective sub-event chain of the plurality of sub-event chains using Bayes theorem.

7. The method of claim 6, wherein the determining the probability of reliability of each of the plurality of unreliable edges in the respective sub-event chain using Bayes theorem comprises: for a given unreliable edge in a given sub-event chain,
determining a first probability that the given sub-event chain occurs when the given unreliable edge is reliable;
determining a second probability that the given unreliable edge is reliable;
determining a third probability that the given sub-event chain occurs; and
determining, based on the first probability, the second probability and the third probability, a given probability of reliability of the given unreliable edge in the given sub-event chain.

8. The method of claim 7, wherein the removing the at least one unreliable edge from the event loop comprises:
removing, from the event loop, an unreliable edge having a lowest degree of reliability, resulting in an updated event loop; and
reordering updated events in the updated event loop as an acyclic event chain.

9. An electronic device, comprising:
a processing unit; and
a memory coupled to the processing unit and storing instructions thereon, the instructions, when executed by the processing unit, executing acts of:
generating, based on a plurality of events associated with an object collected from a plurality of nodes in a distributed file system, an event loop indicating causal dependencies among the plurality of events, wherein the event loop comprises one or more reliable edges and a plurality of unreliable edges;
determining a plurality of degrees of reliability of the plurality of unreliable edges in the event loop, resulting in a determined plurality of degrees of reliability; and
removing, based on the determined plurality of degrees of reliability, at least one unreliable edge from the event loop.

10. The device of claim 9, the acts further comprising:
collecting a plurality of acyclic event chains that were ordered successfully; and
processing the plurality of acyclic event chains; and
storing historical statistical data related to reliable edges and unreliable edges.

11. The device of claim 10, wherein the processing the plurality of acyclic event chains comprises:
splitting, based on a predetermined splitting rule, each of the plurality of acyclic event chains into a plurality of sub-event chains.

12. The device of claim 11, wherein the storing the historical statistical data related to reliable edges and unreliable edges comprises:
for a given edge in a given sub-event chain, determining whether the given edge is a reliable edge or an unreliable edge;
according to a first determination that the given edge is a reliable edge, updating first information related to the reliable edge and the given sub-event chain in a reliable edge data structure; and
according to a second determination that the given edge is an unreliable edge, updating second information related to the unreliable edge and the given sub-event chain in an unreliable edge data structure.

13. The device of claim 9, wherein the generating the event loop indicating the causal dependencies among the plurality of events comprises:
identifying the plurality of unreliable edges in the event loop; and splitting the event loop into a plurality of sub-event chains such that each of the plurality of sub-event chains comprises one unreliable edge, respectively.

14. The device of claim 13, wherein the determining the plurality of degrees of reliability of the plurality of unreliable edges in the event loop comprises:
determining, based on a preconfigured reliable edge data structure and an unreliable edge data structure, a probability of reliability of each of the plurality of unreliable edges in a respective sub-event chain using Bayes theorem.

15. The device of claim 14, wherein determining the probability of reliability of each of the plurality of unreliable edges in the respective sub-event chain using Bayes theorem comprises: for a given unreliable edge in a given sub-event chain,
determining a first probability that the given sub-event chain occurs when the given unreliable edge is reliable;
determining a second probability that the given unreliable edge is reliable;
determining a third probability that the given sub-event chain occurs; and
determining, based on the first probability, the second probability and the third probability, a given probability of reliability of the given unreliable edge in the given sub-event chain.

16. The device of claim 15, wherein the removing the at least one unreliable edge from the event loop comprises:
removing, from the event loop, an unreliable edge having a lowest degree of reliability, resulting in an updated event loop; and
reordering updated events in the updated event loop as an acyclic event chain.

17. A computer program product tangibly stored on a non-transitory computer-readable medium and comprising computer-executable instructions, when executed, cause a computer to execute operations, comprising:
based on events associated with an object collected from nodes of a distributed file system, generating an event loop indicating causal dependencies among the events, the event loop comprising one or more reliable edges and unreliable edges;
determining respective degrees of reliability of the unreliable edges in the event loop; and
based on the respective degrees of reliability, removing an unreliable edge of the unreliable edges from the event loop.

18. The computer program product of claim 17, the operations further comprising:
collecting acyclic event chains that have been ordered temporally; and
based on a result of processing the acyclic event chains, storing historical statistical data related to reliable edges and unreliable edges.

19. The computer program product of claim 18, wherein the processing the acyclic event chains comprises:
based on a defined splitting rule, splitting at least one acyclic event chain of the acyclic event chains into sub-event chains.

20. The computer program product of claim 17, wherein the generating the event loop indicating the causal dependencies among the events comprises:
identifying a number of the unreliable edges in the event loop; and
splitting the event loop into sub-event chains, resulting in the sub-event chains respectively comprising one unreliable edge of the number of the unreliable edges.

* * * * *